United States Patent

Hicks

[15] 3,640,465
[45] Feb. 8, 1972

[54] QUICK-CONNECT HOSE MEMBERS AND CONTROL SYSTEM

[72] Inventor: Margaret L. Hicks, Boulder, Colo.
[73] Assignee: James C. Hicks, Boulder, Colo.
[22] Filed: Apr. 30, 1970
[21] Appl. No.: 33,196

[52] U.S. Cl..............................239/583, 239/586, 239/587, 239/600
[51] Int. Cl..........................................................B05b 1/30
[58] Field of Search..................239/568, 586, 583, 587, 588, 239/600

[56] References Cited

UNITED STATES PATENTS

| | | | |
|---|---|---|---|
| 3,420,449 | 1/1969 | Mincielli et al. | 239/586 X |
| 2,764,452 | 9/1956 | Anderson et al. | 239/583 X |
| 990,179 | 4/1911 | Wilson et al. | 239/586 X |
| 2,281,229 | 4/1942 | Bullock | 239/586 X |
| 2,336,453 | 12/1943 | Bevington | 239/586 |
| 2,568,515 | 9/1951 | Scheiwer | 239/569 X |
| 3,042,312 | 7/1962 | Packard | 239/586 X |
| 3,157,348 | 11/1964 | Danko | 239/583 X |
| 3,188,011 | 6/1965 | Ternullo | 239/586 X |

*Primary Examiner*—Lloyd L. King
*Attorney*—Reilly and Lewis

[57] ABSTRACT

A hose system having releasable slide-fit inlet and outlet end coupling portions together with an on-off valve member and an adjustable spray nozzle member interconnected with lengths of flexible hose between the end coupling portions to be readily connected to and disconnected from the end of a variety of flow devices equipped with complementary slide-fit coupling portions so as to regulate flow therethrough and the spray through the outlet coupling portion.

11 Claims, 4 Drawing Figures

PATENTED FEB 8 1972 3,640,465

*INVENTOR.*
MARGARET L. HICKS

BY Reilly and Lewis

ATTORNEYS.

QUICK-CONNECT HOSE MEMBERS AND CONTROL SYSTEM

This invention relates to fluid flow control devices and more particularly to a novel and improved quick-connect hose members and control system for regulating fluid flow through a hose which affords maximum convenience to the user.

As background, previously used hose couplings and spray nozzles, particularly suitable for garden and home usage, have for the most part employed threaded couplings. One drawback of threaded couplings is that they are frequently not tightened sufficiently to effect a good seal or become damaged and out of shape and as a result leak and unnecessary water is wasted. There is also inconvenience and loss of time of threading and unthreading the couplings to add additional lengths of hose or to add sprinklers. The nozzles for sprinkling and spraying of water heretofore provided require that the water be turned off at the water source or hydrant valve before connecting the outlet end to the sprinkler or to an additional length of hose. The use of the threaded coupling for the spray nozzle frequently results in its becoming lost when detached from the end of the hose.

Accordingly, it is an object of this invention to provide a unique hose system which overcomes many of the above-mentioned disadvantages and inconveniences of existing hose systems as they relate to the watering of a garden or lawn.

Another object of this invention is to provide a hose members and system which provides for alternately spraying and stopping flow therethrough and affords maximum ease of coupling and decoupling other appliances at either end.

Still a further object of this invention is to provide an integral hose assembly which performs all of the necessary control and spray requirements for lawn and garden purposes at a point remote from the source of water under pressure.

A further object of this invention is to provide a versatile hose system including slide-fit-type coupling portions at the intake and discharge ends thereof and in which the end portions of the flow and spray control members have male connector portions which are readily insertable into the end of a conventional flexible hose to be fixedly clamped thereto.

In accordance with the present invention there is provided a hose system including slide-fit coupling portions at each end, an on-off valve member and a nozzle member with coupling portions at each end which are coupled together by flexible hose of a selected length to provide an integral assembly which may spray water from its discharge end, connect to the end of another length of hose or sprinkler appliance, or may be used as an interconnecting link between hose lengths as desired.

Other objects, advantages and capabilities of the present invention will become more apparent as the description proceeds taken in conjunction with the accompanying drawings, in which.

Figure 1:
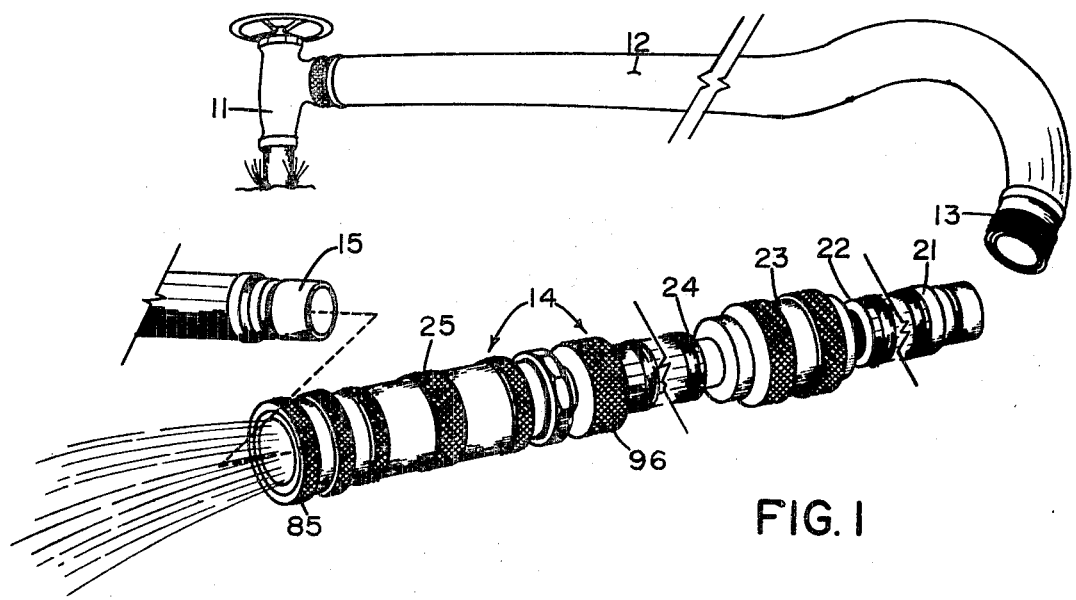
FIG. 1 is a diagrammatic view showing a water tap with a length of flexible hose coupled thereto which transfers water under pressure to a quick-connect hose system shown in a perspective view which may releasably couple to another coupling member shown at its discharge end.

Referring now to the drawings in FIG. 1 a water tap or hydrant 11 is represented as a source of water under pressure and has coupled to one end, a conventional flexible hose 12 with a quick-connect female releasable coupling portion 13 secured at its discharge end. A hose system generally designated by numeral 14 is shown in a position to releasably insert and couple to the end of the quick-connect female releasable coupling portion 13 at its inlet and to a quick-connect male releasable coupling portion 15 at the outlet.

Broadly stated, the quick-connect hose system 14 comprises a coupling member 21 at the inlet end, a flexible hose 22 of a selected length interconnected between coupling member 21 and an on-off valve member 23, together with a flexible hose 24 of a selected length interconnected between the on-off valve member 23 and the inlet of the combined coupling and spray nozzle member 25. A preferred length of hose 24 is about 8 feet to permit cutting off the flow to the spray nozzle member from a point remote from the hydrant.

The inlet coupling member 21 is in the form of a generally tubular or elongated hollow body with a generally cylindrical male coupling portion 31 at one end having a tapered surface 32 at the end and a tapered groove 33 disposed inwardly of the tapered end. This coupling construction is adapted to slidably insert and releasably fasten in the female snap-fit coupling portion 13. A generally cylindrical, headed male coupling portion 34 is provided on the other end of the body member 21 which also has a tapered surface 35 at the end and a shallow, relatively broad, circumferential groove 36 is disposed inwardly of the tapered end. An enlarged central flange section 37 is disposed between the two end coupling portions against which the flexible hose 22 may abut. The inlet end portion of the coupling member 21 will then slide-fit into coupling 13 at the end of a hose and the outlet end will slidably insert into a flexible hose 22 which is fixedly secured thereto preferably by a clamp represented at 38.

The on-off valve member 23 comprises an inner generally tubular or cylindrical valve body 41 having a central partitioning wall 42 separating the body into inlet and outlet passages 43 and 44, respectively. An outer slidable sleeve or hollow cylinder 45 moves back and forth along the inner valve body 41 so as to regulate the flow through the valve body by either admitting flow therethrough or shutting it off fully.

The inner valve body 41 has upper and lower radially extending flow slots 47 and 48, respectively, on the upstream side of the partitioning wall 42 and upper and lower radially extending flow slots 49 and 50, respectively, on the downstream side. An annular groove 51 formed in the partitioning wall carries a flexible sealing O-ring 53. The inner valve body has generally cylindrical male headed hose coupling portions 54 and 55 at each end which are similar to the hose coupling portion 34 above described and including a tapered end surface and a relatively broad shallow groove inwardly of the tapered end which in the assembly thereof slidably inserts into the ends of the flexible hoses 22 and 24, respectively. The hoses 22 and 24 are then shown as being fixedly secured to the coupling portions 54 and 55 by means of clamps 58 and 59, respectively. The inner valve body 41 also includes spaced annular grooves 61 and 62 on each side of the radially extending flow-through slots which carry sealing rings 63 and 64, respectively; groove 61 and associated sealing ring 63 being spaced a further distance from the radial slots to engage the inner surface of the cylinder when slid to the closed position represented in dashed lines at 45a.

The slidable cylinder 45 includes an inner centrally disposed annular groove or recessed area 66 which forms an outer axial flow passage and is arranged so that when it is centered above the radial flow grooves as shown, the fluid flow will pass from the inlet passage 43 along the recessed area 66 and into the outlet passage 44. In the closed position as represented in dashed lines at 45a, the inner surface on one side of groove 66 covers the radial flow slots and the sealing O-rings are in a sealing engagement so as to prevent flow through the radial flow slots.

Figure 4:
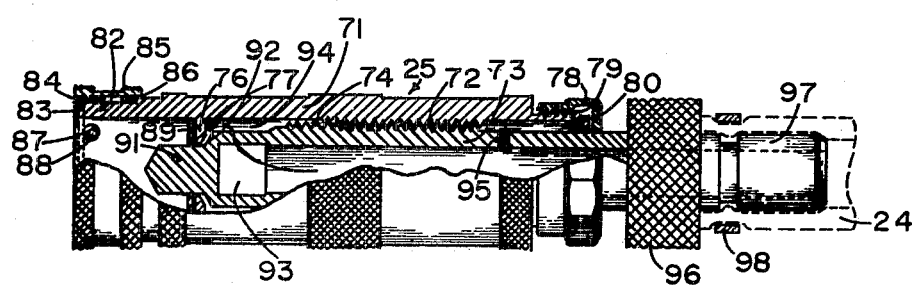
FIG. 4 is a side elevation partially in section of the combined spray nozzle and coupling member of FIG. 1.
Figure 3:
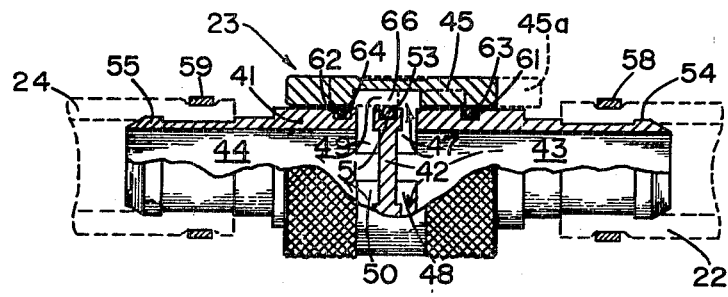
FIG. 3 is a side elevation partially in section of the on-off valve member shown in FIG. 1.
Figure 2:
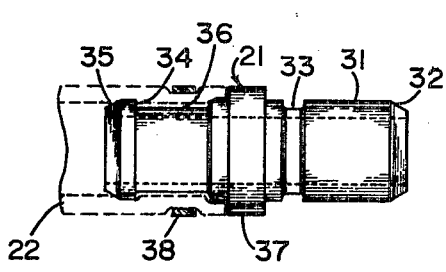
FIG. 2 is a side elevation view partially in section of the intake coupling member shown in FIG. 1.

Referring now to FIG. 4, the combined coupling and spray nozzle member 25 is shown to include an outer generally cylindrical or tubular housing 71 having a section of internal threads 72 into which is threaded an inner generally cylindrical male valve 73 having a section of external threads 74. An inner inturned circumferentially extending flange portion 76 inside the housing has a tapered surface 77 providing a valve seat. A locking cap 78 having internal threads, threads over external threads on the upstream end of the housing 71 to hold gasket members 79 and 80 in place against the ends of the housing and thereby provide a seal against leakage between the outer housing 71 and the inner valve member 73.

The discharge end of the housing 71 is provided with a quick-connect female releasable snap-fit or slide-fit coupling portion including a hollow cylindrical end section 82 with an annular exterior groove 83 which carries a snapring 84. The snapring serves to hold an internally flanged slidable sleeve 85 on the end of the housing. A coil spring 86 under the sleeve is positioned against the housing so that the spring serves to hold the sleeve 85 in the extended position shown. Ball members 87 are arranged in circumferentially spaced openings 88 in the housing and are held by the sleeve to extend radially into a circumferential groove on a male coupling portion to lock the slide-fit male and female coupling portions together in a coupled relation. Three ball members at 120° intervals are preferred. The release of the adjoining coupling 15 is accomplished by moving the sleeve 85 inwardly to compress the spring 86 so that the ball members move radially outwardly so as to clear the groove in the associated male coupling portion. A washer 89 is positioned inside the female coupling portion against flange 79 to prevent leakage.

The inner valve member 73 is generally hollow to conduct fluid therethrough and terminates at its downstream end in a tapered head 91. The tapered head has an inclined shoulder 92 arranged to engage the tapered valve seat surface 77 and has openings 93 is opposite sides which will pass fluid therethrough. The fluid will swirl in a chamber 94 formed by the wall surfaces of the inner and outer members and will pass between the tapered surfaces 77 and 92 and emits as a spray through the hollow interior of the female end coupling portion. This spray is adjusted by threading the inner member 73 into the outer housing 72 by turning it in one direction or the other. The inner valve member 73 has a snapring 95 adjacent the end of its threaded portion and an enlarged portion 96 inwardly of its intake end with a knurled surface and also includes a male insertable slide-fit coupling portion 97 with a tapered edge at the end and a tapered groove inwardly similar to coupling portion 31 above described which permits it to slidably insert into hose section 24 and be fixedly clamped thereto by a clamp 98, or in the alternative this male snap-fit coupling may be directly coupled to a female slide-fit coupling 13 at the end of a supply hose as shown in FIG. 1.

The foregoing hose members and system provide an adjustable spray at the outlet from free flow to a very fine spray. The female coupling portion at the outlet of the spray nozzle member permits it to be readily fastened to and disconnected from another hose, sprinkler, or other watering device without impairing the flow of water. The spray nozzle member being fixedly secured to the hose eliminates the possibility of loss thereof. The on-off valve member provides instant on-off action and saves steps between the work end and faucet as well as loss of water by leakage.

Although the present invention has been described with a certain degree of particularity, it is understood that the present disclosure has been made only by way of example and that changes in details of structure and system components may be made without departing from the spirit and scope thereof.

What is claimed is:

1. A quick-connect flow controlled hose system comprising a male slide-fit inlet coupling member, an on-off valve member coupled to the outlet end of said inlet coupling member and an adjustable spray nozzle member having a female slide-fit outlet coupling portion, said spray nozzle member being coupled to the outlet end of said valve member a preselected distance therefrom whereby to selectively and alternately regulate the fluid flow and spray through said female slide-fit outlet coupling portion, said female slide-fit outlet coupling portion sized to alternately slidably receive the end of a male slide-fit coupling portion at the end of a hose.

2. A quick-connect flow controlled hose system as set forth in claim 1 including a flexible hose connected between said inlet coupling member and the inlet of said valve member and a flexible hose connected between the outlet of said valve member and inlet of said spray nozzle member.

3. A quick-connect flow controlled hose system as set forth in claim 1 wherein said inlet coupling member includes a male slide-fit coupling portion at its inlet end and a male hose coupling at its outlet end sized to slidably insert into the end of a flexible connecting hose.

4. A quick-connect flow controlled hose system as set forth in claim 1 wherein said valve member includes a male hose coupling portion at each end sized to slidably insert into the end of a flexible connecting hose.

5. A quick-connect flow controlled hose system as set forth in claim 1 wherein said male slide-fit coupling portion includes a cylindrical body having a tapered groove inset from the end thereof, said female slide-fit coupling portion having ball members adapted to releasably insert into said tapered groove.

6. A quick-connect flow controlled hose system as set forth in claim 1 wherein said female slide-fit outlet coupling portion has an inturned annular valve seat disposed on an inner wall thereof and an inner annular valve member having side openings adapted to move toward and away from the inturned annular valve seat in selected increments to adjust the spray produced through said outlet coupling portion.

7. A quick-connect flow controlled hose system as set forth in claim 1 wherein said valve member includes an inner cylinder divided by a partitioning wall and having radially extending passages through a wall of the cylinder on each side of the partition wall and a sleeve slidable along the cylinder to alternately and selectively open and close the radial passages.

8. In a quick-connect flow controlled hose system having a source of fluid under pressure, the combination of
    an inlet coupling member having a male slide-fit inlet coupling portion adapted to releasably connect to a supply line,
    a length of flexible hose fixedly connected to the outlet end of said coupling member,
    an on-off valve member to selectively turn the flow on and off having an inlet end inserted into the outlet end of said length of hose and fixedly connected thereto,
    a second length of flexible hose of a preselected length to position the valve member having one end in spaced proximity to the free end of the system and extending over the outlet end of said on-off valve member and fixedly connected thereto,
    an adjustable spray nozzle member to produce a spray of fluid having an inlet end inserted into the outlet end of said second length of hose and fixedly secured thereto, said nozzle member having a female slide-fit outlet coupling portion whereby to selectively and alternately spray through the slide-fit outlet coupling portion and releasably connect to a male coupling portion similar to the male coupling portion of said inlet coupling member.

9. In a hose system as set forth in claim 8 including clamp means encompassing each end of each hose to fixedly secure the end of each hose to its associated member.

10. In a hose system as set forth in claim 8 wherein each end portion clamped to each hose includes a recessed area inwardly of the end thereof.

11. A quick-connect flow controlled hose system comprising a slide-fit inlet coupling member, a valve member coupled to the outlet end of said inlet coupling member and an adjustable spray nozzle member having a female slide-fit outlet coupling portion coupled to the outlet end of said valve member whereby to selectively and alternately regulate the fluid flow and spray through said outlet coupling portion, said slide-fit outlet coupling portion sized to alternately slidably receive the end of a male slide-fit coupling portion and the end of a hose, said female slide-fit outlet coupling portion including circumferentially spaced ball members resiliently urged into the female coupling portion of the nozzle member by an outer slidable sleeve member.

* * * * *